F. PHELPS.
COTTON COMPRESS.
APPLICATION FILED OCT. 23, 1911.
1,038,430.
Patented Sept. 10, 1912.
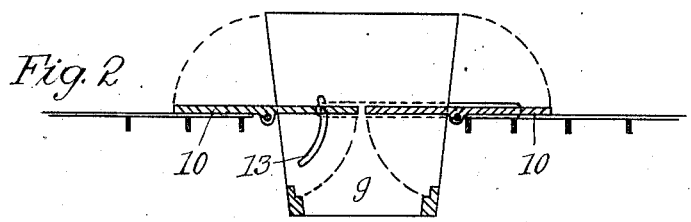
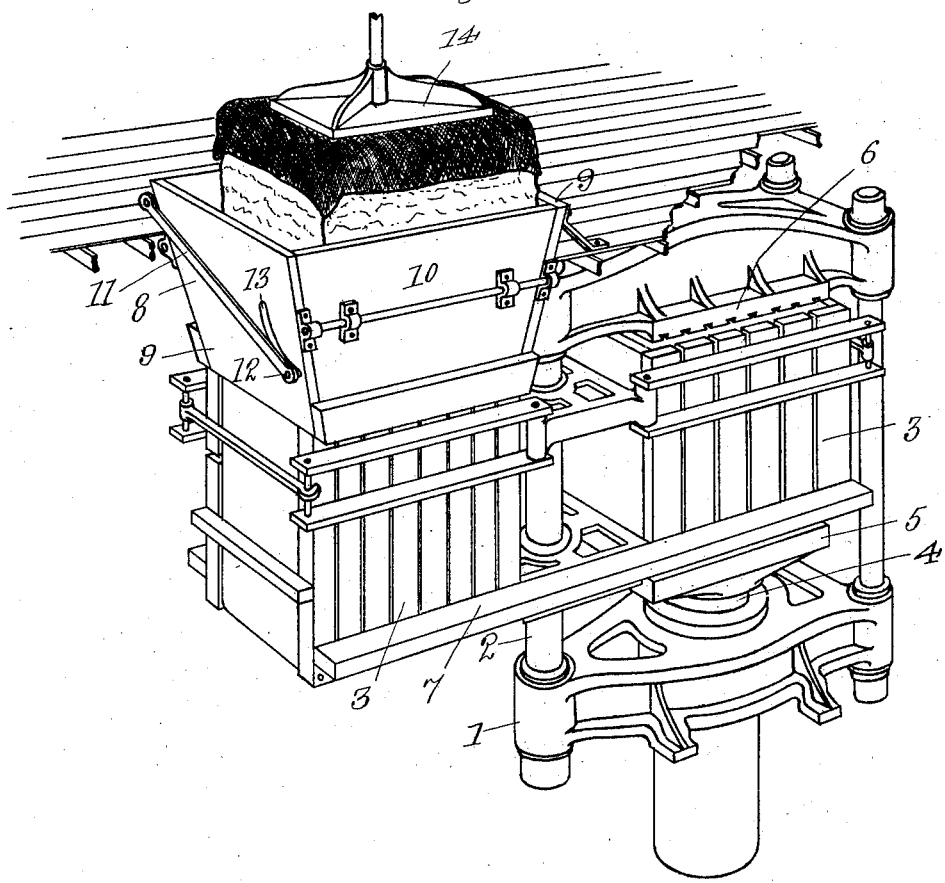
WITNESSES:
INVENTOR
ATTORNEY.

UNITED STATES PATENT OFFICE.

FRANK PHELPS, OF LITTLE ROCK, ARKANSAS.

COTTON-COMPRESS.

1,038,430.

Specification of Letters Patent. Patented Sept. 10, 1912.

Application filed October 23, 1911. Serial No. 656,327.

*To all whom it may concern:*

Be it known that I, FRANK PHELPS, a citizen of the United States, residing at Little Rock, in the county of Pulaski and State of Arkansas, have invented certain new and useful Improvements in Cotton-Compresses, of which the following is a specification.

This invention relates to improvements in cotton compresses and consists in certain novel features which will be hereinafter first fully described and then more particularly pointed out in the appended claims.

The common bale of cotton put up at the gin plant is supposed to form a package 26 inches thick and 54 inches long and compressed in the direction of its width to about 12 lbs. density. These bales are then taken to concentration points and pressed to about 24 lbs. density. While the bales are supposed to be uniform in thickness and length, in actual practice they vary from 21 inches to 38 inches in thickness and in length vary from 54 inches to 72 inches. This lack of uniformity in the size of the bales causes a great waste of space in shipping and the waste is accentuated, rather than decreased, by the use of compresses as now arranged and constructed, owing to the fact that when the pressure is applied to the bale, the bale spreads both in width and length and may assume any dimensions.

It is the object of the present invention to provide means whereby the bales will be uniform in their dimensions so that they will pack closely whether in storage or in transportation and consequently effect a considerable saving in space.

In the accompanying drawings, which illustrate the preferred embodiment of the invention, Figure 1 is a perspective view of a portion of a cotton compress illustrating the operative position of my improvements. Fig. 2 is a detail sectional view of the improved device arranged to initially support the bale.

In carrying out my invention I preferably employ a frame 1, having a post 2 which serves as a pivot for the compression boxes 3—3. A plunger 4 is mounted in this frame and is equipped with a follower block 5 which is adapted to compress the cotton within the compression chamber 3 above the same, against a platen 6 which constitutes a cover for the said compression box or chamber. The compression chamber or boxes 3—3 are preferably of the type shown in Letters Patent No. 885,784, granted to me, and are carried by a frame 7 which is mounted upon the post 2 so as to swing horizontally around the same.

Secured in the floor of the building containing the compress is a hopper or preadmission chamber 8 consisting of stationary side plates 9 converging downwardly toward the compress, and doors or swinging sides 10 mounted between the said fixed sides. These swinging doors are so arranged that when they are disposed horizontally they will rest upon the floor of the building, as shown most clearly in Fig. 2, and when they are raised they will fit closely between the fixed side plates 9 and thereby constitute a complete hopper or preadmission chamber to receive the bale. In order to secure simultaneous movement of these swinging doors and thereby guide the bale into the compression chamber with certainty, I employ links 11 which are pivoted to one of the doors, above the hinge of the same, and connected with the lower end of the opposite door by pins 12 extending through slots 13 formed in the fixed side wall of the hopper on arcs having the hinged or pivotal point of the said swinging door as a center. A plunger 14, operated by any convenient means and arranged in any preferred manner, is provided to force the bale through the hopper or preadmission chamber into the compression chamber. The bale is placed upon the doors 10 while they are in the horizontal position shown in Fig. 2 and the piston or plunger 14 is then operated so as to force the bale down into the compression chamber 3 beneath the said hopper. During this operation, the converging sides of the hopper yieldingly support the bale and tend to resist the action of the plunger 14 as the latter forces the bale through the hopper. The bale will thus be brought into the desired size in one or more of its dimensions and the compression chambers are then swung horizontally around the post 2 so as to bring the bale over the follower block 5, after which the plunger 4 is operated to compress the bale fully against the platen or head 6 thereby reducing the bale to the desired density. After the bale has been thus compressed the doors of the compression chamber are opened and the bale ties applied, as will be readily understood. The bale is then removed and the operation is repeated, a second bale having in the meanwhile been fed through the hopper or preadmission chamber into the first mentioned compression chamber.

The hopper or preadmission chamber 8 will be of such size at its top as to receive any flat bale of cotton and at the bottom will be of the same size as the bottom of the compression chamber, so that as the bale enters the compression chamber it will be reduced to the desired size, in two dimensions, inasmuch as the compression chamber will be of such size as to bring the finished bale into the dimensions required for storage or transportation. The bales will all be thus reduced to the desired density and have uniform dimensions so that they may be more readily handled and a saving of space in shipping vessels and cars will be effected.

In the arrangement illustrated I provide for a continuous operation so that a large number of bales may be easily and rapidly compressed. It is to be understood, however, that I am not limited to the exact device illustrated, as the invention is applicable to a single box compress as well as to a double box compress and the hopper or preadmission chamber may be placed at the bottom or side of the compression chamber as well as at the top.

Having thus described my invention, what I claim and desire to secure by Letters Patent is:

1. In a cotton compress, the combination of a compression chamber, a hopper communicating with the compression chamber and adapted to receive a previously formed bale, means for driving the bale through the hopper and into the compression chamber, the walls of said hopper being so formed as to resist the action of said bale-driving means whereby the bale may be reduced in two dimensions in its passage to the compression chamber.

2. In a cotton compress, the combination of a compression chamber, a hopper communicating with the compression chamber and adapted to receive a previously formed bale, means for driving the bale through the hopper and into the compression chamber, the walls of said hopper being so formed as to yieldably support the bale within the hopper against the action of the bale-driving means, whereby the bale may be reduced in two dimensions in its passage through the hopper.

3. In a cotton compress, the combination with a compression chamber, of a hopper having fixed sides and swinging sides mounted upon and extending between the said fixed sides and adapted to support a bale, the said fixed and swinging sides forming a hopper having a bottom of the same dimensions as the compression chamber, and means for forcing a bale supported above the said swinging sides through the hopper and into the compression chamber.

4. In a cotton compress, the combination with a compression chamber, of fixed side plates converging toward the mouth of the compression chamber, swinging sides mounted upon and extending between the said fixed sides and adapted to support a bale when in a horizontal position, and links having their opposite ends connected respectively to the opposite swinging sides above and below the pivotal supports of the same.

5. In a cotton compress, the combination with a compression chamber, of fixed side walls converging toward the mouth of said compression chamber, swinging side walls mounted upon and extending between the said fixed side walls, said fixed side walls being provided with slots describing arcs about the pivotal point of one swinging side as a center, and links pivoted at one end to the upper end of one swinging side and provided at the opposite end with pins passing through said slots and connected with the lower end of the opposite swinging side.

6. In a cotton compress, the combination of a compression chamber, a hopper having converging sides leading into the compression chamber, means for forcing a bale through the hopper and reducing it in two dimensions in its passage therethrough by pressure against the sides of the hopper, and other means for compressing the bale in the compression chamber.

In testimony whereof I affix my signature, in presence of two witnesses.

FRANK PHELPS.

Witnesses:
R. W. WILLIAMSON,
ORRIN S. ROBINSON.

---

Copies of this patent may be obtained for five cents each, by addressing the "Commissioner of Patents, Washington, D. C."